United States Patent
Surlaker et al.

(10) Patent No.: US 7,761,413 B2
(45) Date of Patent: Jul. 20, 2010

(54) METHOD OF ENSURING AVAILABILITY OF EVENT NOTIFICATION REGISTRATIONS OF A DATABASE MANAGEMENT SYSTEM

(75) Inventors: Kapil Surlaker, Mountain View, CA (US); Shailendra Mishra, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 177 days.

(21) Appl. No.: 11/471,405

(22) Filed: Jun. 19, 2006

(65) Prior Publication Data

US 2007/0266052 A1     Nov. 15, 2007

Related U.S. Application Data

(60) Provisional application No. 60/799,754, filed on May 10, 2006.

(51) Int. Cl.
G06F 7/00 (2006.01)
G06F 17/30 (2006.01)

(52) U.S. Cl. .................................. 707/610; 707/674

(58) Field of Classification Search ................ 707/202, 707/200, 610, 674
See application file for complete search history.

(56) References Cited

U.S. PATENT DOCUMENTS

| | | | | |
|---|---|---|---|---|
| 5,471,629 A | * | 11/1995 | Risch | 707/201 |
| 5,592,664 A | * | 1/1997 | Starkey | 707/1 |
| 5,666,486 A | * | 9/1997 | Alfieri et al. | 709/217 |
| 5,828,882 A | | 10/1998 | Hinckley | |
| 5,999,978 A | * | 12/1999 | Angal et al. | 709/229 |
| 6,092,102 A | * | 7/2000 | Wagner | 340/7.29 |
| 6,182,086 B1 | * | 1/2001 | Lomet et al. | 707/202 |
| 6,292,825 B1 | | 9/2001 | Chang et al. | |
| 6,427,146 B1 | * | 7/2002 | Chu | 707/3 |
| 6,438,705 B1 | * | 8/2002 | Chao et al. | 714/4 |
| 6,560,719 B1 | * | 5/2003 | Pham et al. | 714/15 |
| 6,782,541 B1 | * | 8/2004 | Cohen et al. | 719/318 |
| 6,820,136 B1 | * | 11/2004 | Pham et al. | 709/248 |
| 6,862,565 B1 | | 3/2005 | Elco et al. | |
| 6,920,468 B1 | | 7/2005 | Cousins et al. | |
| 6,931,405 B2 | | 8/2005 | El-Shimi et al. | |
| 7,039,671 B2 | | 5/2006 | Cullen | |
| 7,177,859 B2 | * | 2/2007 | Pather et al. | 707/3 |
| 7,203,706 B2 | | 4/2007 | Jain et al. | |
| 7,315,863 B2 | | 1/2008 | Kambo et al. | |

(Continued)

OTHER PUBLICATIONS

Hanson, Eric N., et al., "A Flexible and Recoverable Client/Server Database Event Notification System", The VLDB Journal, vol. 7, Issue 1, Feb. 1998, pp. 12-24.*

(Continued)

*Primary Examiner*—Robert Stevens
(74) *Attorney, Agent, or Firm*—Townsend and Townsend and Crew LLP

(57) ABSTRACT

A method of ensuring availability of event notification registrations of a database management system is described and provided. The method comprises creating the event notification registrations and storing the event notification registrations in a database of the database management system. Further, the event notification registrations are replicated in a designated database management system to create replicated event notification registrations. If the database management system fails, the replicated event notification registrations are utilized.

15 Claims, 4 Drawing Sheets

U.S. PATENT DOCUMENTS

| | | |
|---|---|---|
| 7,523,459 B2 | 4/2009 | Rusell |
| 7,584,114 B2 | 9/2009 | Estrada et al. |
| 2002/0116248 A1* | 8/2002 | Amit et al. .................... 705/9 |
| 2002/0165998 A1 | 11/2002 | Hrebejk et al. |
| 2003/0055768 A1* | 3/2003 | Anaya et al. ................. 705/36 |
| 2003/0069959 A1* | 4/2003 | Tse ............................ 709/224 |
| 2004/0024794 A1 | 2/2004 | Jain et al. |
| 2004/0088401 A1* | 5/2004 | Tripathi et al. .............. 709/224 |
| 2004/0123183 A1* | 6/2004 | Tripathi et al. ................ 714/31 |
| 2004/0249853 A1 | 12/2004 | Cohen et al. |
| 2004/0254993 A1 | 12/2004 | Mamas |
| 2005/0027742 A1* | 2/2005 | Eichstaedt et al. ........ 707/104.1 |
| 2005/0038772 A1* | 2/2005 | Colrain ........................... 707/1 |
| 2005/0038791 A1 | 2/2005 | Ven |
| 2005/0038801 A1* | 2/2005 | Colrain et al. .............. 707/100 |
| 2005/0038831 A1* | 2/2005 | Souder et al. ............... 707/201 |
| 2005/0038833 A1* | 2/2005 | Colrain et al. .............. 707/203 |
| 2005/0038834 A1* | 2/2005 | Souder et al. ............... 707/203 |
| 2005/0198273 A1* | 9/2005 | Childress et al. ............ 709/224 |
| 2005/0203908 A1* | 9/2005 | Lam et al. ..................... 707/10 |
| 2006/0200501 A1* | 9/2006 | Holenstein et al. .......... 707/202 |
| 2006/0235831 A1* | 10/2006 | Adinolfi et al. ................ 707/3 |
| 2006/0277299 A1* | 12/2006 | Baekelmans et al. ........ 709/224 |
| 2007/0112885 A1* | 5/2007 | Farr ........................... 707/202 |
| 2007/0192386 A1* | 8/2007 | Fries et al. ................... 707/204 |
| 2007/0214191 A1* | 9/2007 | Chandrasekaran .......... 707/202 |
| 2007/0240169 A1 | 10/2007 | Surlaker et al. |
| 2007/0240170 A1 | 10/2007 | Surlaker et al. |
| 2007/0250545 A1 | 10/2007 | Surlaker et al. |
| 2007/0266393 A1 | 11/2007 | Surlaker et al. |
| 2007/0276914 A1 | 11/2007 | Surlaker et al. |
| 2008/0098044 A1* | 4/2008 | Todd ........................... 707/202 |

OTHER PUBLICATIONS

"Sun One Messaging and Collaboration Event Notification Manual," Sun Microsystems, 2002, pp. 1-16.

Cyran, "Oracle Database, Concepts, 10g Release 1 (10.1)", Dec. 2003; 732 pages.

\* cited by examiner

300

310 create an event notification registration in DBMS 10 for a client 320 store the event notification registration in the database 15 of DBMS 10

330 automatically replicate the event notification registration in the designated DBMS 30 to create a replicated event notification registration 340 if DBMS 10 fails, utilize the replicated event notification registration stored in database 35

Figure 3

METHOD OF ENSURING AVAILABILITY OF EVENT NOTIFICATION REGISTRATIONS OF A DATABASE MANAGEMENT SYSTEM

RELATED U.S. APPLICATION

This patent application claims priority to the co-pending provisional patent application, Ser. No. 60/799,754, entitled "DATABASE MANAGEMENT SYSTEM AND METHODS," and with filing date May 10, 2006.

BACKGROUND OF THE INVENTION

1. Field of the Invention

The present invention generally relates to database management systems. More particularly, the present invention relates to ensuring availability of event notification registrations of a database management system.

2. Related Art

A database management system (DBMS) may allow clients to set up individual event notification registrations to notify the clients when certain DBMS-related events occur. The clients can be database users, software programs, etc. Examples of DBMS-related events include, for example, messages being published to a particular queue, instances or databases going up or down, database objects changing, and system alerts being issued.

Each event notification registration includes DBMS-related event(s) of interest and the manner of delivering the event notification to the client. For example, delivery may be made over a network to a client specified host and port, may be made by email, may be made by HTTP, or may be made by invocating a stored PL/SQL procedure. To clients, some DBMS-related events of interest are more important than others.

SUMMARY OF THE INVENTION

A method of ensuring availability of event notification registrations of a database management system is described and provided. The method comprises creating the event notification registrations and storing the event notification registrations in a database of the database management system. Further, the event notification registrations are replicated in a designated database management system to create replicated event notification registrations. If the database management system fails, the replicated event notification registrations are utilized.

BRIEF DESCRIPTION OF THE DRAWINGS

The accompanying drawings, which are incorporated in and form a part of this specification, illustrate embodiments of the invention and, together with the description, serve to explain the principles of the present invention.

FIG. 3 illustrates a flow chart showing a method of automatically ensuring availability of event notification registrations of a database management system in accordance with an embodiment of the present invention.

DETAILED DESCRIPTION OF THE INVENTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Typically, the event notification registrations of one DBMS are not shared with other DBMSs. As a result, the event notification registrations are not available for clients who might failover to a standby DBMS or who migrate their sessions to another DBMS due to failure of the DBMS. In contrast, the invention provides replication of the event notification registrations to another DBMS so that the event notification registrations are not lost for clients who depend on the event notifications and who migrate to standby DBMSs or other DBMSs due to failure of the original DBMS.

Figure 1:
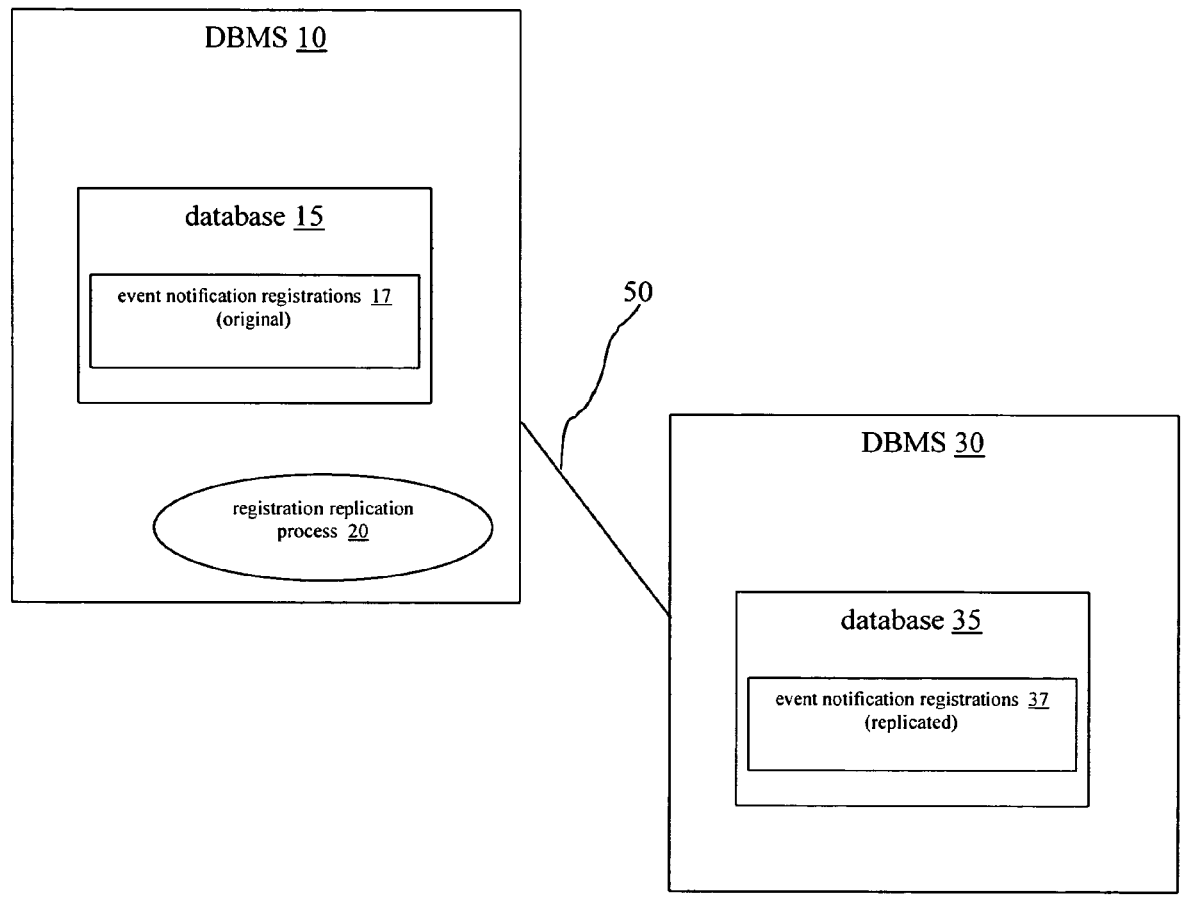
FIG. 1 illustrates a plurality of database management systems in accordance with an embodiment of the present invention.

FIG. 1 illustrates a plurality of database management systems 10 and 30 in accordance with an embodiment of the present invention. DBMS 10 includes database 15 and a registration replication process 20 while DBMS 30 includes database 35. The communication link 50 connects DBMS 10 and DBMS 30.

In an embodiment, the database 15 stores the original event notification registrations 17 while database 35 stores the replicated event notification registrations 37. The registration replication process 20 facilitates the replication of the original event notification registrations 17 to the DBMS 30 via the communication link 50. It should be understood that the original event notification registrations 17 can be replicated to more than one DBMS. Moreover, the replication may occur automatically or may occur based on the replication preference received for the event notification registration. A DBMS is designated for the replication of the original event notification registrations 17. Here, DBMS 30 has been designated.

DBMS 10 and DBMS 30 may be in a common cluster of database management systems (DBMSs). Alternatively, DBMS 10 and DBMS 30 may be in different clusters of DBMSs. If the DBMS 10 fails, the replicated event notification registrations 37 are utilized by DBMS 30 to notify clients of the occurrence of DBMS-related event(s) of interest. Due to the failure of DBMS 10, some DBMS-related event(s) of interest no longer occur while other DBMS-related event(s) of interest may still occur.

Figure 2:
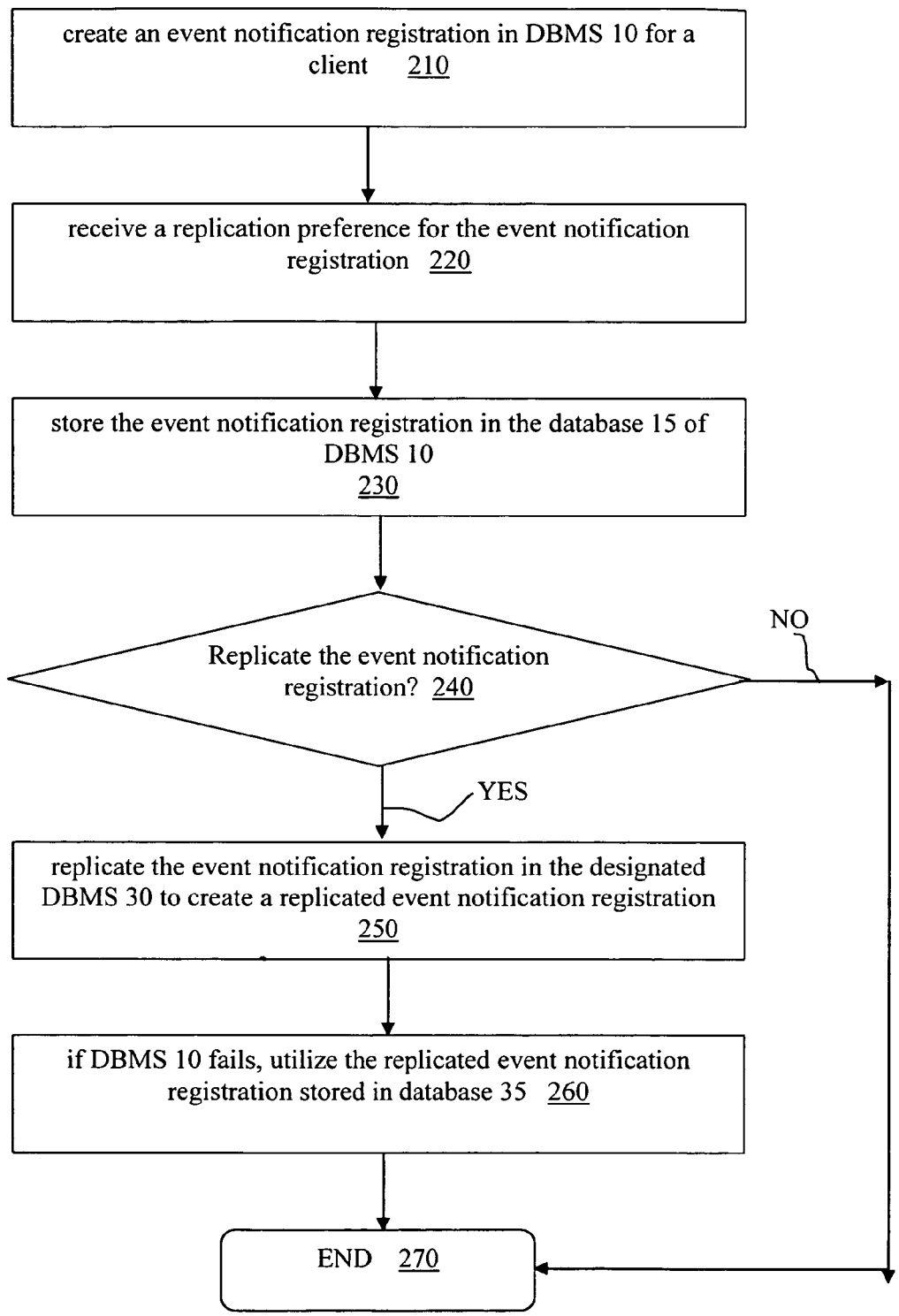
FIG. 2 illustrates a flow chart showing a method of ensuring availability of event notification registrations of a database management system based on received replication preference of each event notification registration in accordance with an embodiment of the present invention.

FIG. 2 illustrates a flow chart showing a method 200 of ensuring availability of event notification registrations of a database management system based on received replication preference of each event notification registration in accordance with an embodiment of the present invention. Reference is made to FIG. 1.

At Block 210, an event notification registration is created in DBMS 10 for a client.

Continuing, at Block 220, a replication preference for the event notification registration is received. The replication preference indicates whether the client wants to ensure availability of the event notification registration by replication in case DBMS 10 fails.

Further, at Block 230, the event notification registration is stored in the database 15 of DBMS 10. The event notification registration includes the replication preference.

At Block 240, it is determined whether to replicate the event notification registration. Performance of the replication depends on the replication preference of the event notification registration.

If the replication preference indicates replication should not be performed, the event notification registration is not replicated in the designated DBMS 30, at Block 270.

If the replication preference indicates replication should be performed, the event notification registration is replicated in the designated DBMS 30 to create a replicated event notification registration, at Block 250. The replicated event notification registration is stored in database 35. In an embodiment, the registration replication process 20 facilitates the replication of the original event notification registration to the DBMS 30 via the communication link 50. Replication includes replicating additions to the event notification registration, replicating deletions to the event notification registration, and replicating modifications to the event notification registration.

Furthermore, if DBMS 10 fails, DBMS 30 utilizes the replicated event notification registration stored in database 35 to notify clients of the occurrence of DBMS-related event(s) of interest, at Block 260. The method 200 ends at Block 270.

Similarly, Blocks 210-270 are performed for the rest of the event notification registrations originating in DBMS 10.

FIG. 3 illustrates a flow chart showing a method 300 of automatically ensuring availability of event notification registrations of a database management system in accordance with an embodiment of the present invention. Reference is made to FIG. 1.

At Block 310, an event notification registration is created in DBMS 10 for a client.

Further, at Block 320, the event notification registration is stored in the database 15 of DBMS 10.

Continuing, at Block 330, the event notification registration is automatically replicated in the designated DBMS 30 to create a replicated event notification registration. The replicated event notification registration is stored in database 35. In an embodiment, the registration replication process 20 facilitates the replication of the original event notification registration to the DBMS 30 via the communication link 50. Replication includes replicating additions to the event notification registration, replicating deletions to the event notification registration, and replicating modifications to the event notification registration.

Furthermore, if DBMS 10 fails, DBMS 30 utilizes the replicated event notification registration stored in database 35 to notify clients of the occurrence of DBMS-related event(s) of interest, at Block 340.

Similarly, Blocks 310-340 are performed for the rest of the event notification registrations originating in DBMS 10.

In an embodiment, the invention is configured as computer-executable instructions stored in a computer-readable medium, such as a magnetic disk, CD-ROM, an optical medium, a floppy disk, a flexible disk, a hard disk, a magnetic tape, a RAM, a ROM, a PROM, an EPROM, a flash-EPROM, or any other hardware from which a computer can read.

Figure 4:
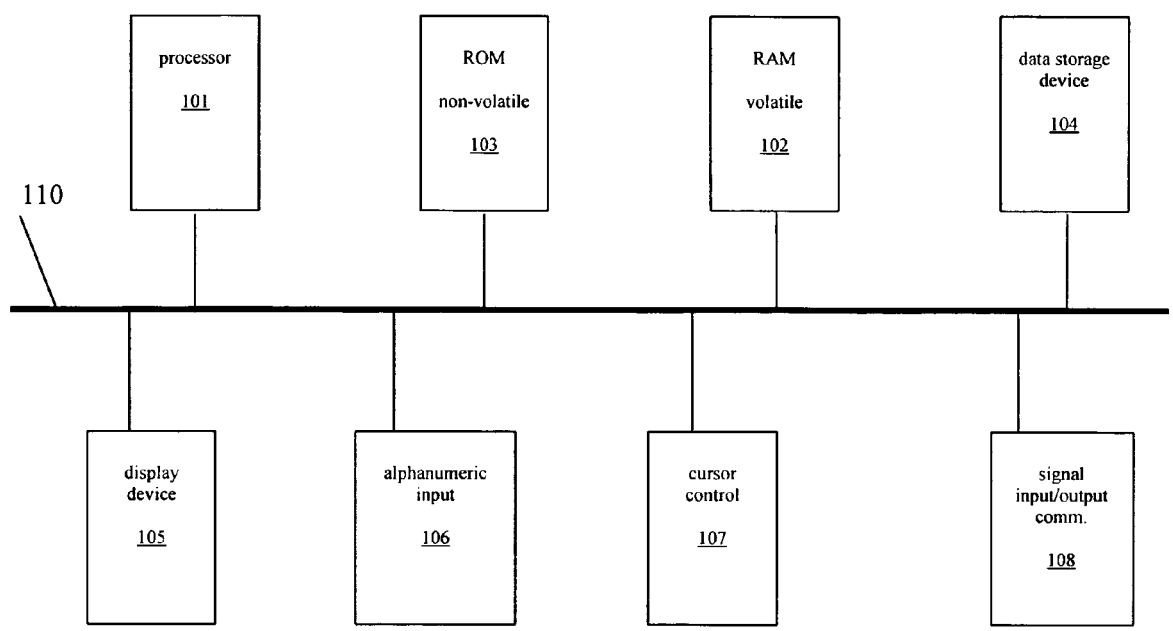
FIG. 4 illustrates an exemplary computer system on which embodiments of the present invention may be practiced.

FIG. 4 illustrates an exemplary computer system 400 on which embodiments of the present invention may be practiced. Aspects of the present invention can be implemented or executed on a computer system or any other computational system. Although a variety of different computer systems can be used with the present invention, an exemplary computer system 400 is shown in FIG. 4.

With reference to FIG. 4, portions of the present invention are comprised of computer-readable and computer executable instructions which reside, for example, in computer-usable media of an electronic system such as the exemplary computer system 400. FIG. 4 illustrates an exemplary computer system 400 on which embodiments of the present invention may be practiced. It is appreciated that the computer system 400 of FIG. 4 is exemplary only and that the present invention can operate within a number of different computer systems including general-purpose computer systems and embedded computer systems.

Computer system 400 includes an address/data bus 110 for communicating information, a central processor 101 coupled with bus 110 for processing information and instructions, a volatile memory 102 (e.g., random access memory RAM) coupled with the bus 110 for storing information and instructions for the central processor 101 and a non-volatile memory 103 (e.g., read only memory ROM) coupled with the bus 110 for storing static information and instructions for the processor 101. Exemplary computer system 400 also includes a data storage device 104 ("disk subsystem") such as a magnetic or optical disk and disk drive coupled with the bus 110 for storing information and instructions. Data storage device 104 can include one or more removable magnetic or optical storage media (e.g., diskettes, tapes), which are computer-readable memories. Memory units of computer system 400 include volatile memory 102, non-volatile memory 103 and data storage device 104.

Exemplary computer system 400 can further include a signal input/output communication device 108 (e.g., a network interface card "NIC") coupled to the bus 110 for interfacing with other computer systems. Also included in exemplary computer system 400 of FIG. 4 is an alphanumeric input device 106 including alphanumeric and function keys coupled to the bus 110 for communicating information and command selections to the central processor 101. Exemplary computer system 400 also includes a cursor control or directing device 107 coupled to the bus 110 for communicating user input information and command selections to the central processor 101. A display device 105 can also be coupled to the bus 110 for displaying information to the computer user. Display device 105 may be a liquid crystal device, other flat panel display, cathode ray tube, or other display device suitable for creating graphic images and alphanumeric characters recognizable to the user. Cursor control device 107 allows the user to dynamically signal the two-dimensional movement of a visible symbol (cursor) on a display screen of display device 105. Many implementations of cursor control device 107 are known in the art including a trackball, mouse, touch pad, joystick or special keys on alphanumeric input device 106 capable of signaling movement of a given direction or manner of displacement. Alternatively, it will be appreciated that a cursor can be directed and/or activated via input from alphanumeric input device 106 using special keys and key sequence commands.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of ensuring availability of event notification registrations of a first database management system, said method comprising:

creating said event notification registrations, each event notification registration specifying an event occurrence in the first database management system for which a client should be notified;

receiving a replication preference for each event notification registration, said replication preference indicating whether to replicate a respective event notification registration;

storing said event notification registrations in a database of said first database management system;

based on said replication preference, replicating said event notification registrations in a designated second database management system to create replicated event notification registrations; and subsequent to a failure of the first database management system, notifying the client of the occurrence of events in the second database management system that match events specified by the replicated event notification registrations.

2. The method as recited in claim 1 wherein said replicating comprises:
   replicating additions to said event notification registrations;
   replicating deletions to said event notification registrations; and
   replicating modifications to said event notification registrations.

3. The method as recited in claim 1 wherein said first database management system and said designated second database management system are in a common cluster.

4. The method as recited in claim 1 wherein said first database management system and said designated second database management system are in different clusters.

5. The method as recited in claim 1, wherein said replication preference indicates a preference of the client that the event notification registration should be available if the first database management system fails.

6. A computer-readable medium comprising computer-executable instructions stored therein for performing a method of ensuring availability of event notification registrations of a first database management system, said method comprising:

creating said event notification registrations, each event notification registration specifying an event occurrence in the first database management system for which a client should be notified;

receiving a replication preference for each event notification registration, said replication preference indicating whether to replicate a respective event notification registration;

storing said event notification registrations in a database of said first database management system;

based on said replication preference, replicating said event notification registrations in a designated second database management system to create replicated event notification registrations; and subsequent to a failure of the first database management system, notifying the client of the occurrence of events in the second database management system that match events specified by the replicated event notification registrations.

7. The computer-readable medium as recited in claim 6 wherein said replicating comprises:
   replicating additions to said event notification registrations;
   replicating deletions to said event notification registrations; and
   replicating modifications to said event notification registrations.

8. The computer-readable medium as recited in claim 6 wherein said first database management system and said designated second database management system are in a common cluster.

9. The computer-readable medium as recited in claim 6 wherein said first database management system and said designated second database management system are in different clusters.

10. The computer-readable medium as recited in claim 6, wherein said replication preference indicates a preference of the client that the event notification registration should be available if the first database management system fails.

11. An apparatus comprising:
   a memory comprising instructions stored therein; and
   a processor for executing said instructions to perform a method of ensuring availability of event notification registrations of a first database management system, comprising:

creating said event notification registrations, each event notification registration specifying an event occurrence in the first database management system for which a client should be notified;

receiving a replication preference for each event notification registration, said replication preference indicating whether to replicate a respective event notification registration;

storing said event notification registrations in a database of said first database management system;

based on said replication preference, replicating said event notification registrations in a designated second database management system to create replicated event notification registrations; and subsequent to a failure of the first database management system, notifying the client of the occurrence of events in the second database management system that match events specified by the replicated event notification registrations.

12. The apparatus as recited in claim 11 wherein said replicating comprises:
   replicating additions to said event notification registrations;
   replicating deletions to said event notification registrations; and
   replicating modifications to said event notification registrations.

13. The apparatus as recited in claim 11 wherein said first database management system and said designated second database management system are in a common cluster.

14. The apparatus as recited in claim 11 wherein said first database management system and said designated second database management system are in a common cluster.

15. The apparatus as recited in claim 11, wherein said replication preference indicates a preference of the client that the event notification registration should be available if the first database management system fails.

* * * * *